April 21, 1970  C. C. PEASE  3,508,028

SPUD WELDING APPARATUS

Filed March 3, 1969

INVENTOR.
Charles C. Pease

BY Charles F. Duffield

ATTORNEY.

United States Patent Office 3,508,028
Patented Apr. 21, 1970

3,508,028
SPUD WELDING APPARATUS
Charles C. Pease, 6320 Harvey Ave.,
Pennsauken, N.J. 08110
Continuation-in-part of application Ser. No. 633,844,
Apr. 26, 1967. This application Mar. 3, 1969, Ser.
No. 803,851
Int. Cl. B23k 9/00
U.S. Cl. 219—136                                            5 Claims

ABSTRACT OF THE DISCLOSURE

Apparatus and method for welding hollow studs (spuds) over a hole in a workpiece which includes the use of a hollow arc shield disposed within the hollow spud and having one end thereof projecting into the hole in the workpiece to provide alignment for the spud over the hole and to maintain the hole free of molten metal during the welding operation. The spud preferably includes a chamfer in the weldable end thereof. The chuck for retaining the spud includes a second chuck therein for retaining one end of the internal arc shield and serves both as a retainer for the arc shield and as a stop member for the spud.

BACKGROUND OF INVENTION

This application is a continuation-in-part of application Ser. No. 633,844, filed Apr. 26, 1967.

The present invention applies to the art of stud welding and, more specifically, to apparatus and methods of welding a spud over a hole in a workpiece.

There are many industrial applications where a tubular member must be welded over an opening or hole in a plate. An example of one such application is the welding of fittings to a boiler for the attachment of gages, valves etc. In most of these applications, access is available only to one side of the metal plate to which the tubular member is to be welded.

Such tubular members are, at present, welded over the holes by conventional hand welding techniques. Such hand welding techniques, are, of course, quite time consuming and thus very costly in the industry.

OBJECTS AND SUMMARY OF INVENTION

It is the principal object of the present invention to provide a method and apparatus for welding spuds by means of the electric stud welding technique.

It is a further object of the present invention to improve the quality of the weld between the spud and workpiece and maintain the hole in the workpiece free from molten metal by use of an internal arc shield.

It is a further object of the present invention to provide a welding gun having an improved chuck which is capable of receiving both the stud and the internal arc shield assembly.

The present invention carries out the foregoing objects by utilizing an internal arc shield within the hollow stud or spud. The internal arc shield is generally of external configuration complimentary with the internal configuration of the spud. One end of the arc shield includes an end portion thereof which is of configuration complimentary with the hole over which the stud is to be welded and is adapted to pass through the hole when the stud is in place. The arc shield serves both to locate the stud properly over the hole and, also, to prevent the molten metal from flowing into the hole thus blocking the hole in the welding operation. In a preferred embodiment, the internal arc shield is formed of a hollow refractory material which may be easily disintegrated and removed from the hole after completion of the welding operation.

The welding apparatus includes a first chuck which resiliently grips and retains the spud to be welded. Disposed within the first chuck is a second chuck which is adapted to grip and retain the internal arc shield when disposed within the spud. The second chuck is threadedly engaged in the first chuck at one end thereof and the opposite end includes a shoulder which serves as a stop for the spud within the first chuck. The threaded engagement of the first and second chunks permit relative adjustment of the two chucks in respect to each other to accommodate different lengths of spuds.

Other objects and advantages of the present invention will appear from the detailed description thereof taken in view of the drawings.

DETAILED DESCRIPTION OF INVENTION

Figure 1:
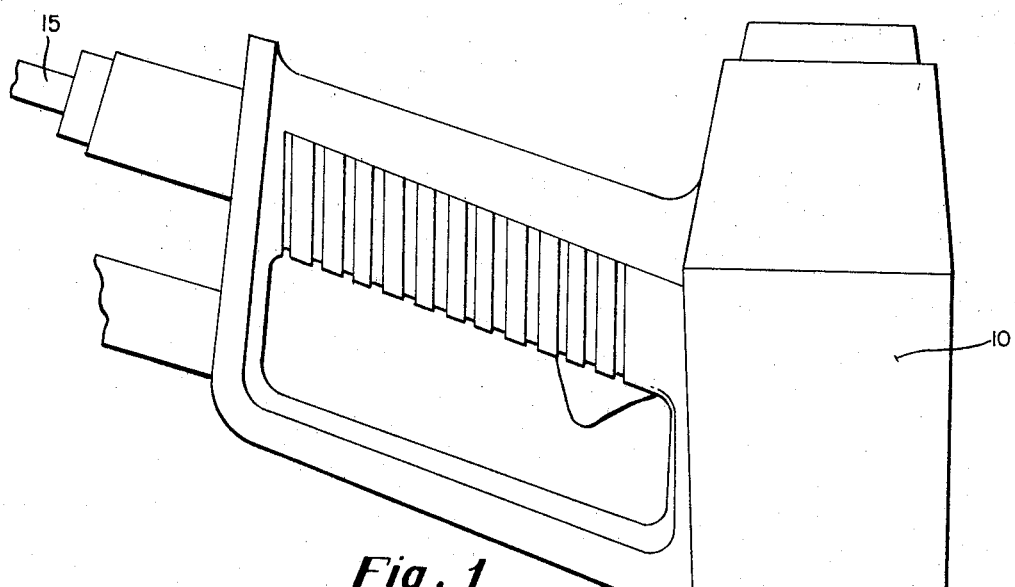
FIGURE 1 is a side elevational view partly in section showing the spud and internal arc shield of the present invention in place within the chuck assembly of the present invention.

The internal arc shield, spud and chuck of the present invention are shown in FIGURE 1 in use with a stud welding gun 10. The stud welding gun 10 may be of the type disclosed in application Ser. No. 381,991, by Frank K. Kelman, filed July 13, 1964, although the invention is not limited to such a gun as there disclosed.

The stud welding gun 10 includes a leg 11 which supports a foot piece 12. Within the foot piece 12, there is disposed an arc shield retainer 13 which supports and positions an arc shield 14 around the external periphery of the end of the stud to be welded. The welding gun is controlled through a conductor 15 and the welding current for the welding process is supplied through welding a conductor 16 to a metallic chuck 17. To this point, the welding gun 10 is as a number of conventional welding guns in use and the operation thereof is well understood by those skilled in the art.

In accordance with the present invention, the chuck 17 is modified so as to receive and hold a hollow spud 18. Disposed within the spud 18 is an internal arc shield 19.

The welding end of the stud 20 is placed in engagement with the workpiece 21 and centered over the hole 22 about which the spud is to be welded. The internal arc shield 19 has one end 23 thereof of configuration generally complementary with the hole 22 in the workpiece and is of such length that, when disposed within the chuck 17, the end 23 of the arc shield will extend through the hole 22 in the workpiece 21.

The opposite end 24 of the arc shield is retained in place by a second chuck member 25. The chuck member 25 includes resilient fingers 26 thereon. The ends 27 of the resilient fingers provide a stop for the opposite end of the stud 18.

The opposite end of the chuck 25 includes a threaded extension 28 thereon which threadedly engages the chuck 17. In this manner, relative adjustment may be made between the chuck 25 and the larger chuck 17 to accommodate for different lengths of spuds.

In use, the spud and arc shield are inserted into their respective chucks and the arc shield inserted into the hole 22. The arc shield serves to align the stud 18 properly over the hole in preparation for the welding operation. Upon the initiation of the welding current, the end 20 of the spud and the contiguous portion of the workpiece will become molten and fusion bonding will result. The presence of the internal arc shield 19 within the hole will properly form an internal fillet around the end of the spud 18 and, as well, prevent the molten metal from falling into the hole 22. The external arc shield 14 serves to form a fillet around the external periphery of the spud in a manner well known to those skilled in the art.

Following the completion of the welding cycle, the gun is withdrawn from the spud and the internal arc shield 19 withdrawn from the hole 22.

In some instances, the internal arc shield 19 may remain within the hole 22 whenever the gun is pulled away from the spud. This quite often occurs due to the presence of the molten metal surrounding the hole 22 which locks the internal arc shield within the hole. When this occurs, the internal arc shield may be removed by fracturing the arc shield with a percussive blow.

Figures 3, 4:
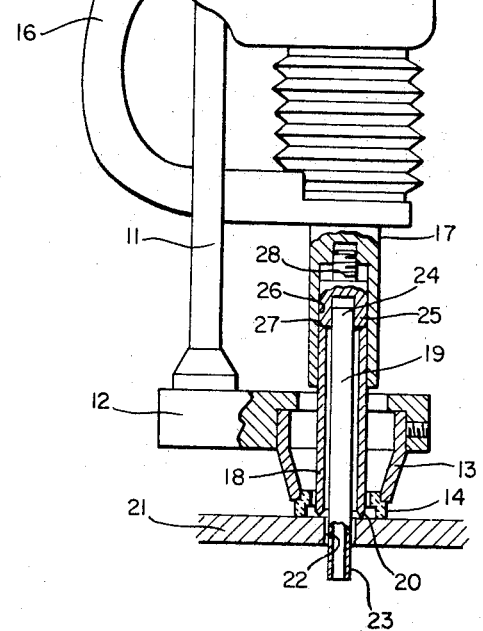
FIGURE 3 is a side elevational view partly in section showing a further embodiment of spud of the present invention.
FIGURE 4 is a side elevational view partly in section of the internal arc shield of the present invention.

In accordance with the present invention as shown in FIGURE 4, an internal arc shield 29 of hollow configuration may be employed. The hollow arc shield 29 will function exactly as the solid arc shield for the purposes of aligning the stud and keeping the hole free of molten metal. However, the hollow arc shield has a further advantage of being easily destructed for removal from the hole following the completion of the welding process.

Figure 2:
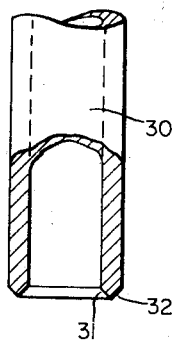
FIGURE 2 is a side elevation partly in section of a spud according to the present invention.

The configuration of the welding end of the spud has been found to be important. The best configuration from the standpoint of ease of welding and of bonding strength has been found to be that shown in the spud 30 of FIGURE 2. The spud 20 includes both an internal and external chamfer 31 and 32 respectively.

Another configuration which has been found successful is shown in FIGURE 3. The spud 33 of this configuration includes an external chamfer 34 on the welding end thereof.

In one embodiment, the spuds welded were of ⅝ inch outside diameter and of .400 inch inside diameter. The hole over which they were welded was of .400 diameter and the inside and outside diameters of the internal arc shield were ⅜ and ¼ inch respectively.

It is anticipated that the spud welding apparatus and methods of the present invention may be employed either with the arc or the capacitor discharge welding methods.

The present invention has been described in respect to the particular embodiments thereof shown in the drawings but no limitation is thereby intended but instead the scope of the invention is to be interpreted in view of the appended claims.

I claim:
1. An arc shield for use in welding a hollow stud over a hole in a workpiece wherein the inside diameter of the stud is at least equal to the diameter of the hole comprising:

an elongate refractory internal arc shield of external configuration generally complementary with the inside configuration of the stud to be welded to the workpiece, and the tip portion of said arc shield being of configuration complementary with the hole in the workpiece whereby the arc shield may be disposed within the stud with its tip portion extending into the hole for aligning the stud over the hole and maintaining the hole free of molten metal during welding of the stud to the workpiece.

2. The arc shield of claim 1 wherein the arc shield is hollow permitting easier disintegration and removal of the arc shield from the hole following completion of the welding cycle.

3. In the art of stud welding a hollow stud over an aperture in the member to which the stud is to be welded, the improvement of an internal arc shield for aligning the stud over the aperture and for maintaining the aperture free of molten metal during the welding operation comprising:

a refractory member having a first end thereof of configuration slightly smaller than the inside configuration of the end of the stud to be welded permitting the refractory member to be inserted within the end of the stud to form a weld fillet during the welding operation, and the opposite end of said refractory member being formed to a configuration slightly smaller than the aperture over which the stud is to be welded permitting said opposite end to pass within the aperture to maintain the aperture free from molten metal and align the stud over the aperture.

4. The internal arc shield of claim 3 wherein the first end of the refractory member is of greater length than the stud to be welded whereby a portion of the first end will extend from the stud by which portion the arc shield may be secured within a welding gun and used to remove the arc shield from the stud following the welding operation.

5. The arc shield of claim 3 wherein the refractory member is hollow permitting easy destruction and removal of the arc shield from the stud and aperture.

References Cited
UNITED STATES PATENTS 2,623,974  12/1952  Prucha _____ 219—98 X JOSEPH V. TRUHE, Primary Examiner C. L. ALBRITTON, Assistant Examiner U.S. Cl. X.R.

219—98

UNITED STATES PATENT OFFICE
Certificate

Patent No. 3,508,028
Patented April 21, 1970

Charles C. Pease

Application having been made by Charles C. Pease, the inventor named in the patent above identified, and Omark Industries, Inc., Portland, Oregon, the assignee, for the issuance of a certificate under the provisions of Title 35, Section 256, of the United States Code, adding the names of Ralph K. Ritter and Elliott J. Fay as joint inventors, and a showing and proof of facts satisfying the requirements of the said section having been submitted, it is this 9th day of March 1971, certified that the names of the said Ralph K. Ritter and Elliott J. Fay are hereby added to the said patent as joint inventors with the said Charles C. Pease.

FRED W. SHERLING
*Associate Solicitor.*